United States Patent
D'Aquino et al.

(10) Patent No.: US 8,023,422 B2
(45) Date of Patent: Sep. 20, 2011

(54) DUAL CORE CROSSPOINT SYSTEM

(75) Inventors: Stefano D'Aquino, Westford, MA (US); Kimo Y. F. Tam, Lincoln, MA (US)

(73) Assignee: Analog Devices, Inc., Norwood, MA (US)

( * ) Notice: Subject to any disclaimer, the term of this patent is extended or adjusted under 35 U.S.C. 154(b) by 1004 days.

(21) Appl. No.: 11/716,965

(22) Filed: Mar. 12, 2007

(65) Prior Publication Data

US 2008/0225885 A1    Sep. 18, 2008

(51) Int. Cl.
*H04L 12/26* (2006.01)
*H03F 3/45* (2006.01)

(52) U.S. Cl. .................................. 370/252; 330/256

(58) Field of Classification Search ............ 370/369, 370/468, 409, 252
See application file for complete search history.

(56) References Cited

U.S. PATENT DOCUMENTS

| | | | | |
|---|---|---|---|---|
| 5,629,641 | A * | 5/1997 | Cheng | 327/108 |
| 6,998,798 | B1 * | 2/2006 | Guan et al. | 315/370 |
| 2001/0040521 | A1 * | 11/2001 | Albinet et al. | 341/152 |
| 2006/0006942 | A1 * | 1/2006 | Ueno et al. | 330/258 |
| 2008/0274714 | A1 * | 11/2008 | Yamaji et al. | 455/341 |

OTHER PUBLICATIONS

U.S. Appl. No. 11/524,016, D'Aquino et al.

* cited by examiner

*Primary Examiner* — Dang T Ton
*Assistant Examiner* — Nourali Mansoury
(74) *Attorney, Agent, or Firm* — Knobbe Martens Olson & Bear LLP

(57) ABSTRACT

A dual core crosspoint system includes a differential signal core for receiving N differential input channels with common mode voltage removed and providing m differential output channels with m output stages associated with the m output channels; and a common mode core for receiving N common mode voltage input channels derived from the N differential input channels and providing m common mode voltage output channels simultaneously with the m differential output channels.

16 Claims, 12 Drawing Sheets

DUAL CORE CROSSPOINT SYSTEM

FIELD OF THE INVENTION

An improved, dual core crosspoint system.

BACKGROUND OF THE INVENTION

Crosspoints exist on the market which connect a plurality of N inputs to a plurality of m outputs, with each output being connected to a single input at most. Their usefulness arises from the need to connect source signals (video and audio, for example) to multiple loads (video monitors, for example), where the connectivity matrix can be conveniently reprogrammed via a digital interface.

Crosspoints exist which accept single-ended sources to produce single-ended outputs (single-ended-in single-ended-out), as well as crosspoints which accept their inputs from differential sources and produce differential outputs (differential-in differential-out). In the latter case, the differential inputs carry no useful common-mode (CM) information, so that the output common-mode is simply redefined and set equal to an arbitrary reference value.

In some cases the common mode voltages can be used to carry useful information such as control signals for horizontal and vertical control circuits for video information carried by the accompanying differential signal. One solution is to just construct larger crosspoint systems which can handle all of the differential signals and their accompanying common mode voltage so that they arrive simultaneously with the video carried by the differential signal. One shortcoming with that approach is that the voltage headroom is now more constrained by having to accommodate both the common mode voltage range and the differential signal range.

BRIEF SUMMARY OF THE INVENTION

It is therefore an object of this invention to provide an improved, dual core crosspoint system It is a further object of this invention to provide such an improved, dual core crosspoint system using separate differential signal and common mode cores.

It is a further object of this invention to provide such an improved, dual core crosspoint system which allows for transmission of common mode information such as for horizontal and vertical video synchronization.

It is a further object of this invention to provide such an improved, dual core crosspoint system which reduces voltage headroom constraints.

It is a further object of this invention to provide such an improved, dual core crosspoint system which eliminates input noise associated with the average common mode signal.

The invention results from the realization that an improved crosspoint system which allows transmission of common mode information without impinging on voltage headroom constraints can be achieved with dual cores, one core to switch the differential signals with common modes removed and a second core to independently switch the removed common modes and recombine them with their corresponding differential signals.

The subject invention, however, in other embodiments, need not achieve all these objectives and the claims hereof should not be limited to structures or methods capable of achieving these objectives.

This invention features a dual core crosspoint system including a differential signal core for receiving N differential input channels with common mode voltage removed and providing m differential output channels. There are m output stages associated with the m output channels. A common mode core receives the N common voltage input channels derived from the N differential input channels and provides m common mode voltage output channels simultaneously with the m differential output channels.

In a preferred embodiment the m common mode voltage input channels are injected into the m output stages to present the N differential output channels recombined with their removed common mode voltages. Each input channel may include three inputs. There may be a trifferential amplifier associated with each common mode input channel for receiving three common mode input voltages derived from three corresponding differential input channels and providing to the combined inputs in its associated common mode input channel three common mode voltages with the average common mode voltage removed. Each output stage may include three output sections. Each output section may include a current to voltage converter and a buffer amplifier. The average common mode voltage may be set to a reference common mode voltage by the trifferential amplifier. There may be a decoder and a vertical control and a horizontal control and the m common mode voltage output channels may be connected to the decoder to selectively drive the vertical and horizontal controls. The differential input channels may include three differential inputs and the common mode channels may include three single ended inputs. Each channel may include a color slice including a plurality of slices. Each output stage may include a logic gate responsive to a control signal for selectively injecting into the output stages either associated common mode output channels or an average common mode voltage. Each slice may include a feedback circuit connected between the output of its associated output stage and the input of each input channel. Each slice in the differential signal core may provide a differential feedback signal. In a differential signal core each slice may further include an attenuator circuit in the feedback circuit for removing the common mode voltage in the differential feedback signal and redefining the common mode voltage applied to the differential input channel. In the common mode core each slice may provide a single ended feedback signal. In the common mode core each slice may further include an attenuator circuit.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1A:
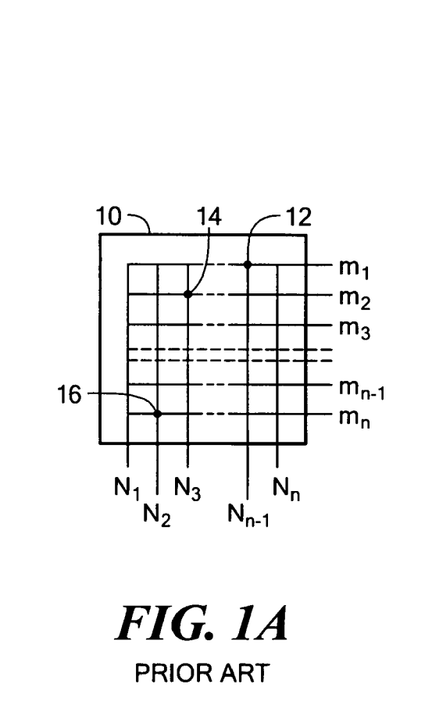
FIG. 1A is a schematic diagram of a prior art crosspoint switch.

There is shown in FIG. 1A a conventional crosspoint switch 10 including a number of input channels $N_1$, $N_2$, $N_3$ ... $N_{n-1}$, $N_n$ and m channel outputs, $m_1$, $m_2$, $m_3$ ... $m_n$. Each output channel m can connect to one and only one input channel N. The intersection of each input channel $N_1$-$N_n$ and output channel $m_1$-$m_n$ contains a point cell. If the point cell is enabled that input is connected to that output, otherwise not. For example, the solid black dots representing point cells 12, 14 and 16 indicate that those point cells are closed so that input channel $N_{n-1}$ is connected to output channel $m_1$. Input channel $N_3$ is connected to output channel $m_2$, input channel $N_2$ is connected to $m_n$, all respectively.

Figure 1B:
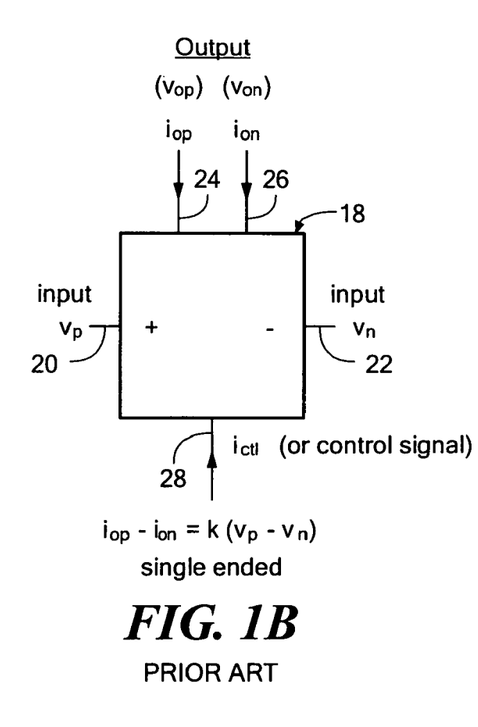
FIG. 1B is a schematic diagram of a prior art single ended point cell for a crosspoint switch such as shown in FIG. 1A.
Figure 1C:
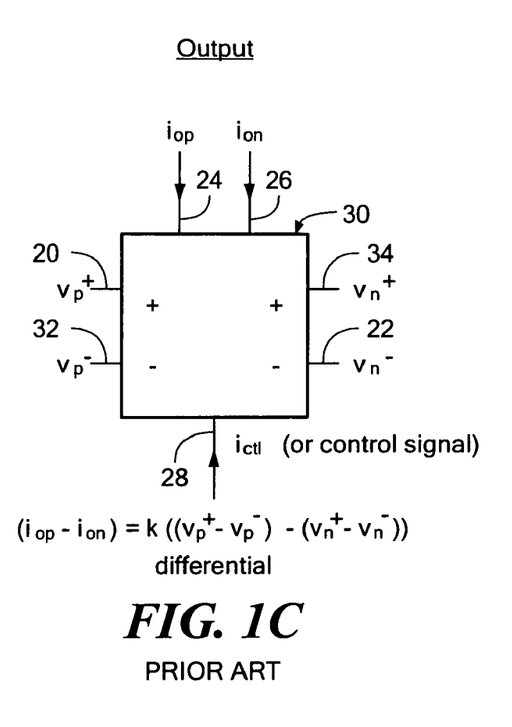
FIG. 1C is a schematic diagram of a prior art differential point cell for a crosspoint switch such as shown in FIG. 1A.

Point cells such as point cells 12, 14 and 16 may be single ended as shown in FIG. 1B, or differential as shown in FIG. 1C. Single ended point cell 18, FIG. 1B, receives its inputs $v_{p+}$ and $v_{n-}$ at 20, 22 and provides its outputs $i_{op}$ ($v_{op}$) 24 and $i_{on}$ ($v_{on}$) 26. The control signal $i_{ctl}$ may be applied at 28. Differential point cell 30, FIG. 1C, includes the same signals as shown with respect to point cell 18, FIG. 1B. But in order to provide the differential inputs, input 20 $V+_p$ has associated with it a negative signal $V-_p$ 32 and input $V-_n$ 22 has associated with it a positive signal $V+_n$ 34. In FIG. 1B the input channel of point cell 18 includes two inputs 20 and 22. In FIG. 1C the input channel of point cell 30 includes differential signals 20 and 32 and 34 and 22.

Figure 2A:
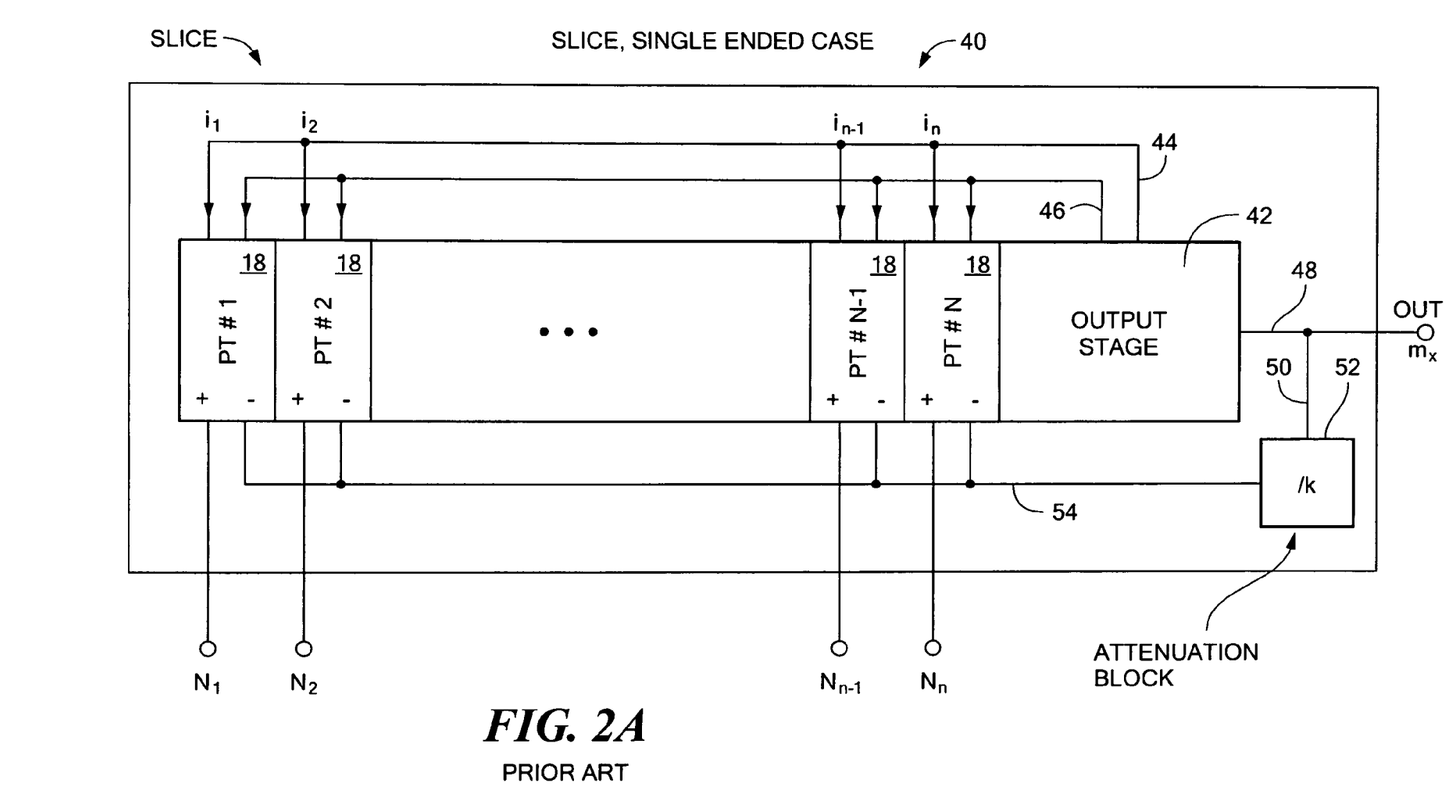
FIG. 2A is a schematic diagram of a prior art single ended slice of a crosspoint switch.

Typically as shown in FIG. 2A the point cells, such as point cells 18 are arranged in rows or slices 40, which include a number of point cells 18 aligned in a row. Also associated with point cells 18 is an output stage 42. All of the outputs $i_1$, $i_2$; ... $i_{n-1}$, $i_n$ are delivered on lines 44 and 46 to output stage 42. The output from whichever point cell 18 is enabled is then provided by output stage 42 on line 48 as output $m_x$. This output is fed back through a feedback circuit 50 which may include attenuator 52 to provide a second negative feedback input on line 54 to each of single ended point cells 18. Attenuator 52 is used to set the gain desired between the inputs $N_1$, $N_2$ ... and the outputs $m_1$, $m_2$ ....

Figure 2B:
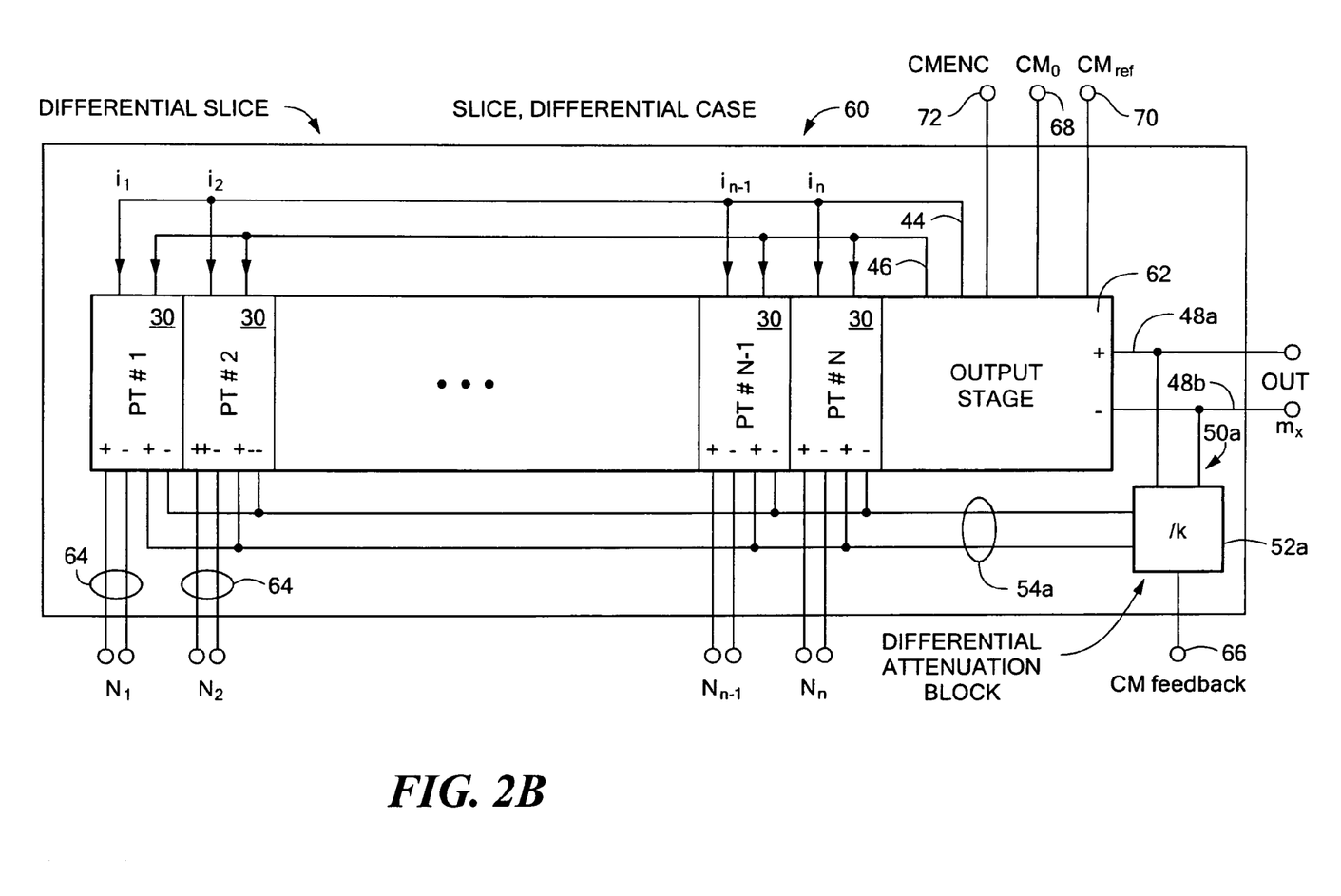
FIG. 2B is a schematic diagram of a prior art differential slice of a crosspoint switch.

The construction of a slice for a differential circuit is the same as shown by slice 60, according to this invention, FIG. 2B. Differential slice 60 also has an output stage 62 associated with it and each differential point cell 30 now has a set of differential inputs 64 in each channel $N_1$, $N_2$ ... along with common mode voltage. In addition, the output includes differential outputs 48a, 48b, and feedback circuit 50a includes a pair of feedback lines 54a that provide the attenuated output from attenuator circuit 52a to the differential point cells 30. Here attenuator circuit 52a includes a common mode feedback input 66 which adjusts in order to match the common mode of the feedback signal on lines 54a to the common mode of the external input on line 64 to each cell. Output stage 62 also receives a common mode signal 68, common mode reference signal 70, and common mode encoded signal 72.

Figure 3:
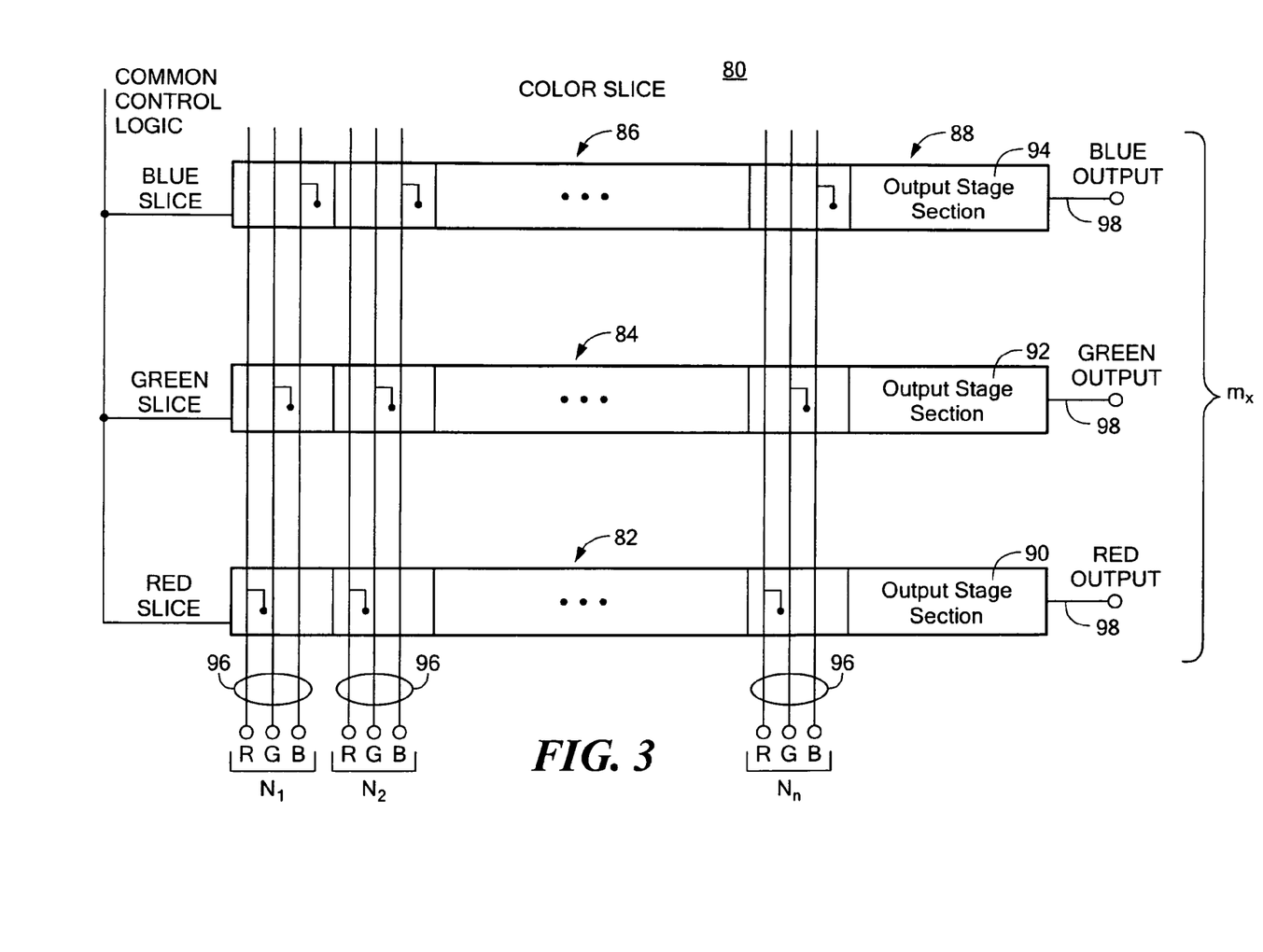
FIG. 3 is a schematic diagram of a prior art single ended color slice of a crosspoint switch.

When crosspoint switches are used in video applications where all signals occur in triplet, red, blue and green, there is another level of hierarchy. That is, a color slice 80, FIG. 3, contains in it three slices, a red slice 82, a green slice 84, and blue slice 86. In this arrangement output stage 88 includes three output sections, 90, 92, 94, one associated with each slice, 82, 84, 86, respectively, in color slice 80. Each input channel $N_1$, $N_2$ ... $N_n$ now includes three sets of inputs 96 and the output $m_x$ from each color slice includes a set of three outputs 98.

Figure 4:
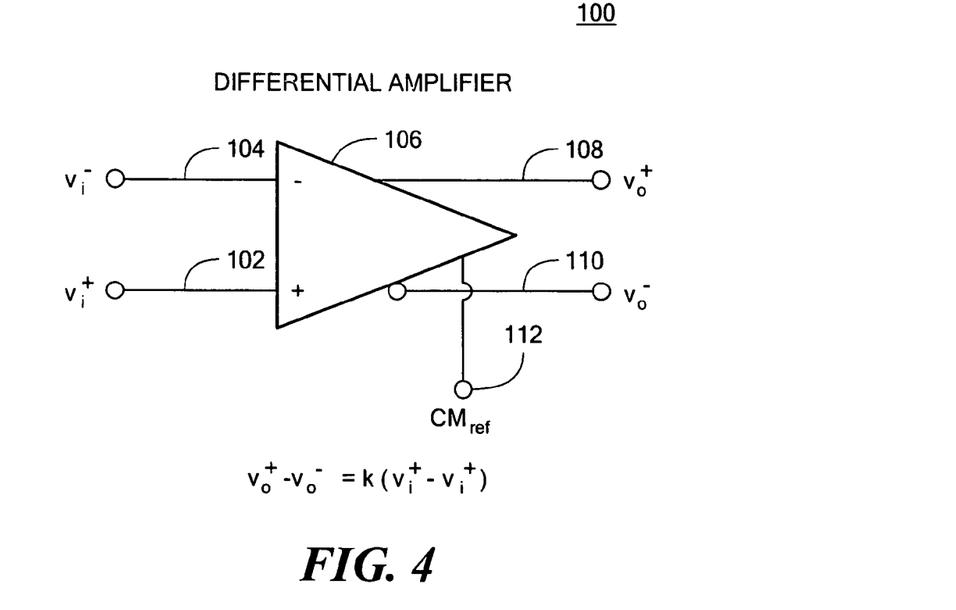
FIG. 4 is a schematic diagram of a typical prior art differential amplifier used in implementing the crosspoint system of this invention.

Employed in each crosspoint switch is a differential amplifier 100, FIG. 4, which has a pair of differential inputs $v_{i+}$ 102 and $v_{i-}$ 104 to amplifier 106 which provides differential outputs $V_{0+}$ 108 and $V_{0-}$ 110. The common mode voltage associated with the inputs at 102 and 104 does not appear at the outputs 108 and 110. Rather the common mode voltage applied to common mode reference node 112 becomes the common mode associated with the differential outputs at 108 and 110.

Figure 5:
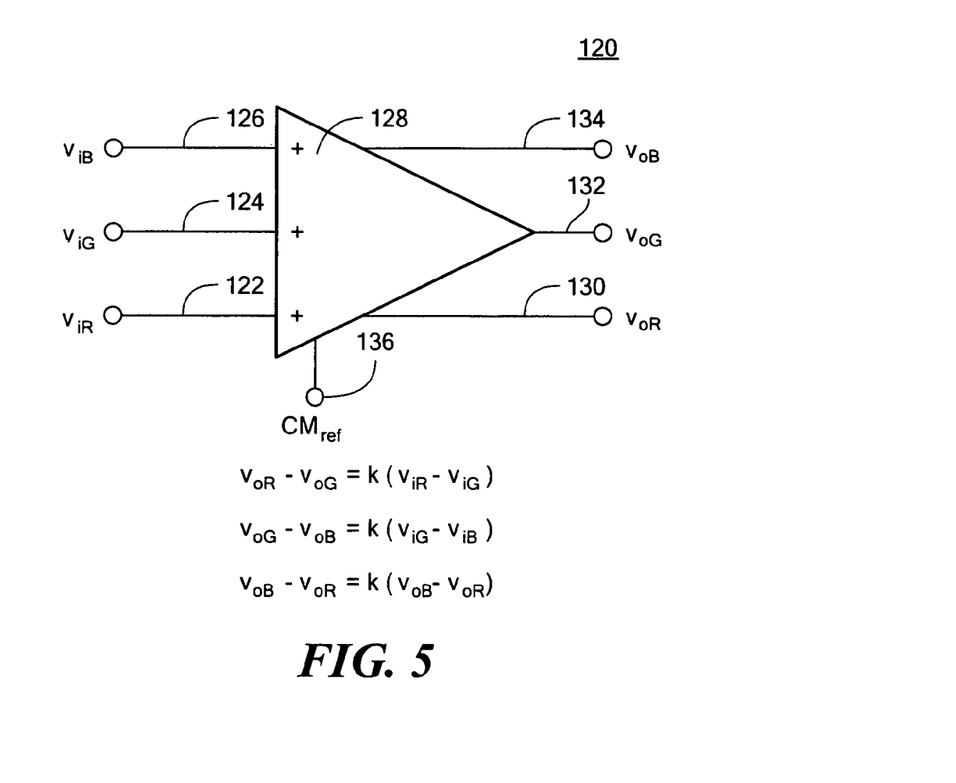
FIG. 5 is a schematic diagram of a prior art trifferential amplified used in implementing the crosspoint system of this invention.

In a similar fashion trifferential amplifier 120, FIG. 5, includes three inputs 122, 124 and 126 corresponding to the three colors $V_{iR}$, $V_{iG}$, $V_{iB}$, to amplifier 128 which provides trifferential outputs $V_{oR}$, 130; $V_{oG}$, 132; $v_{oB}$, 134; and a trifferential output 130, 132, 134. As with respect to FIG. 4, the common mode accompanying the input 122, 124, 126 has been removed and the common mode accompanying the outputs 130, 132, 134 is determined by the voltage on common mode reference 136. This is more fully explained in U.S. patent application Ser. No. 11/524,016 filed on Sep. 20, 2006, entitled, TRIFFERENTIAL AMPLIFIER AND TRIFFERENTIAL AMPLIFIER SYSTEM, having the same inventorship and same assignee as the instant case which is incorporated herein in its entirety by this reference.

Figure 6:
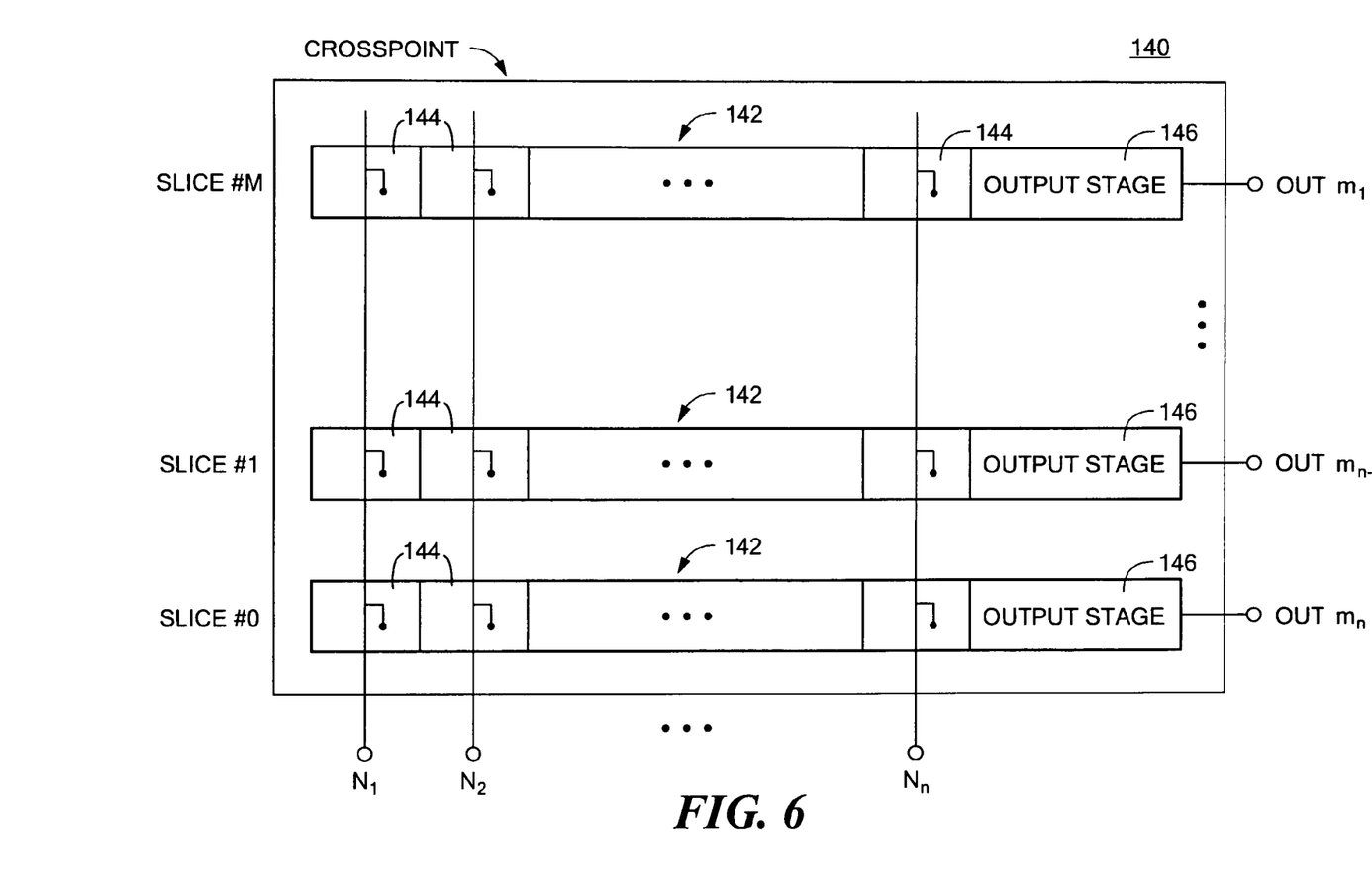
FIG. 6 is a schematic diagram of a prior art single ended crosspoint switch.
Figure 7:
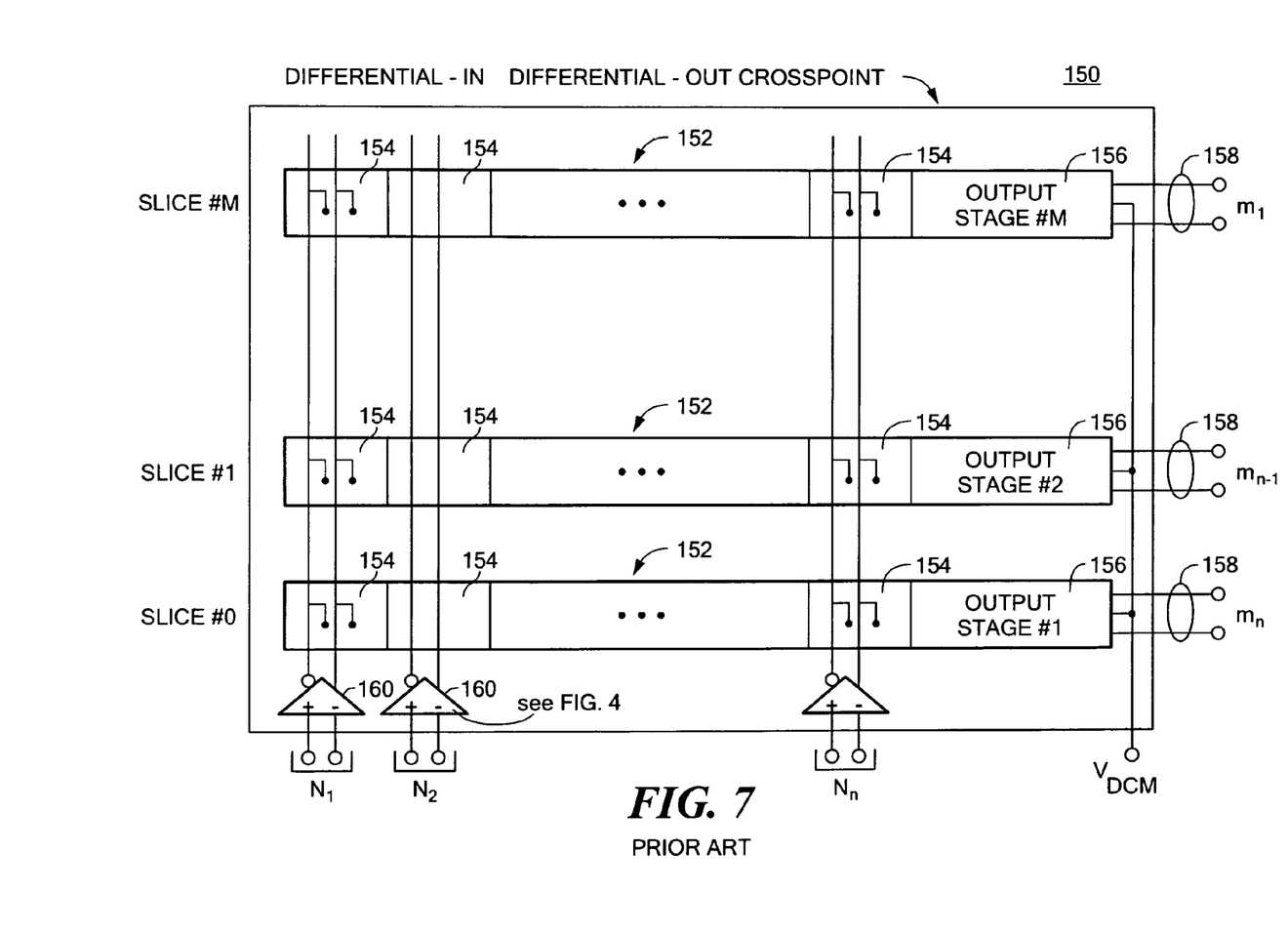
FIG. 7 is a schematic diagram of a prior art differential crosspoint switch.

A full, single ended crosspoint switch 140, FIG. 6, has a number of rows or color slices or slices, 142, each containing $N_1$, ... $N_n$ point cells 144 and an output stage which if the slices 142 are color slices contains a number of sections commensurate with the number of slices in a color slice. Note, that in designating the input channels $N_1$, $N_2$ ... $N_n$ and the output channels $m_1$, $m_2$ ... $m_n$ it might be inferred that there need be an equal number of input channels to output channels. This is not a necessary limitation of the invention. The subscript n is meant in its broadest sense to indicate that any number of channels can be present at the output/input and they are not at all required to be equal in number. In one typical application for example there are 16 inputs and 9 outputs. A differential crosspoint 150, FIG. 7, is shown once again as including a plurality of slices 152, which may be color slices containing a number of elemental slices. Each elemental slice 152 contains a plurality of differential point cells 154 and an output stage 156 which, if slices 152 are color slices, will have a number of sections equal to the number of slices in the color slice. With differential crosspoint 150 the output channels include a set of differential inputs 158 and the inputs $N_1, N_2 \ldots N_n$ are provided through differential amplifiers 160 to the associated ones of point cells 154.

Figure 8:
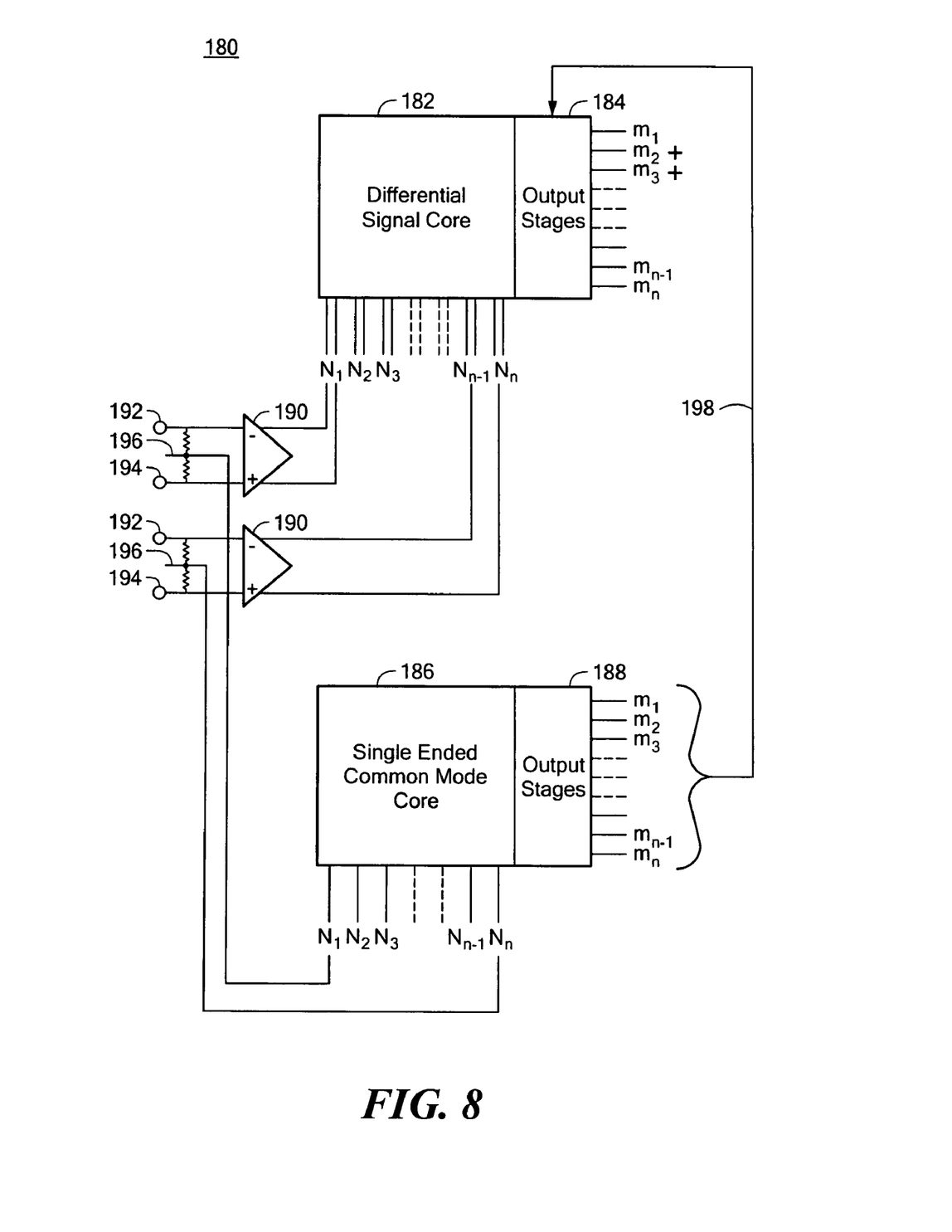
FIG. 8 is a schematic diagram of a dual core crosspoint system according to this invention.

In accordance with this invention, FIG. 8, a dual core crosspoint system 180 includes a differential signal core 182 with output stage 184 and a second single ended common mode core 186 with output stage 188. Here, each channel $N_1$-$N_n$ is provided with a differential input amplifier 190. The differential input signal with common mode voltage appears at input terminals 192, 194. The differential signal is delivered by differential amplifier 190 to channel $N_1$ and subsequently to core 182. Similarly channel $N_{n-1}$ may receive an input from its differential amplifier 190. Assume that the point cells are enabled. Thus the input channel $N_1$ appears on output channel $m_2$ and the input on channel $N_n$ appears on output channel $m_3$. The common mode voltage at each amplifier 190 is tapped off at tap 196 in each case and is delivered to the corresponding input channel $N_1$-$N_n$ in single ended common mode core 186. The point cells in core 186 are enabled in a similar pattern to those in differential signal core 182. And so the common modes appear on outputs $m_2$, and $m_3$ from output stages 188. These common mode voltages are now delivered on line 198 to output stage 184 where they are recombined with the differential signal outputs on outputs $m_2$ and $m_3$ of differential signal core 182.

Figure 9:
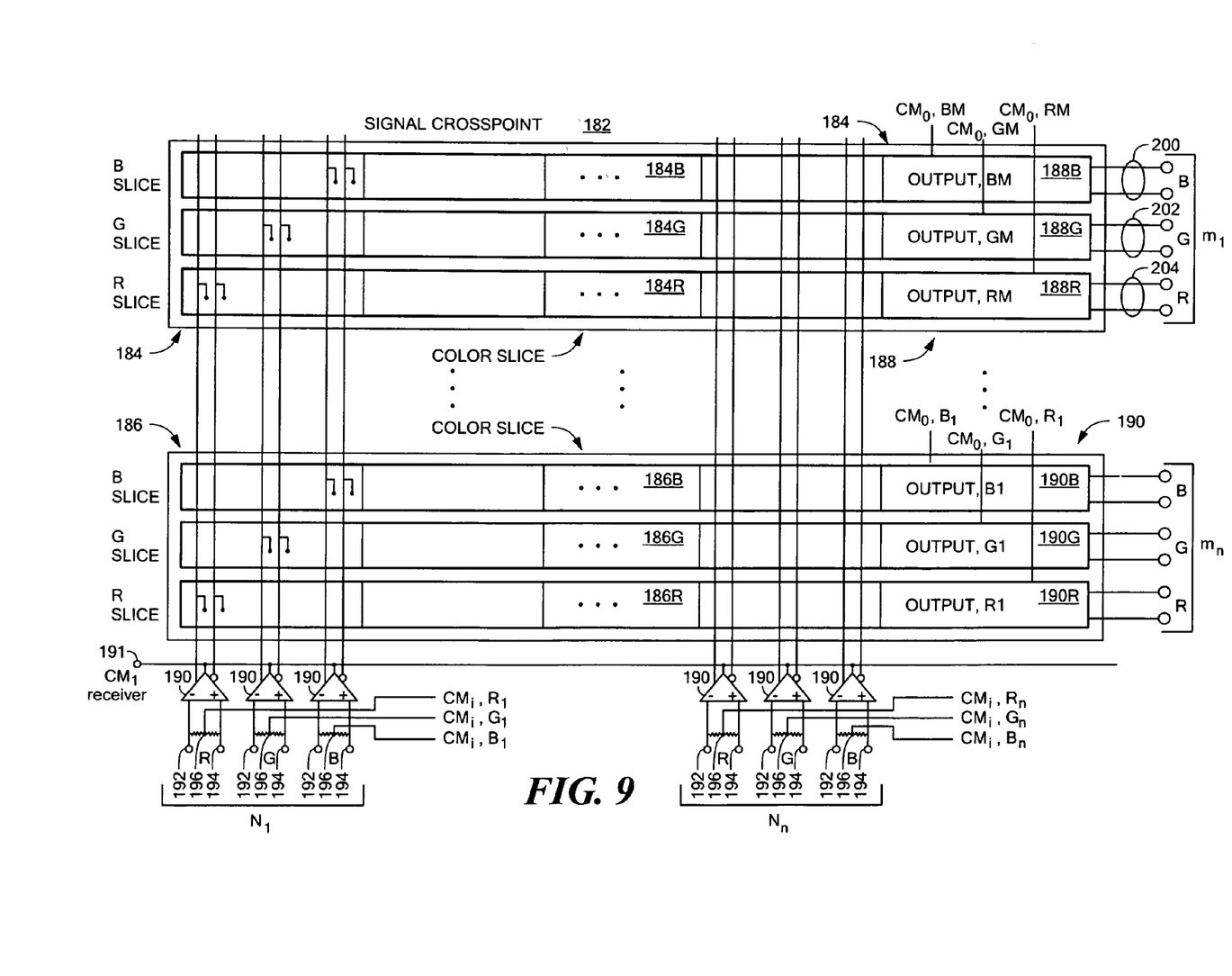
FIG. 9 is a more detailed schematic diagram of the signal crosspoint of FIG. 8.

Signal crosspoint core 182 is shown in more detail in FIG. 9 where it includes a number of color slices 184 . . . 186 each containing three slices 184-B, 184-G, 184-R and 186-B, 186-G, 186-R, known as the red, blue and green slices, respectively. Output stage 184 actually includes an output stage 188 . . . 190 associated with each color slice 184 . . . 186 each of which includes an output stage section 188-B, 188-G, 188-R and 190-B, 190-G, 190-R. Here each input channel as indicated at amplifier channels $N_1$ and $N_n$ is serviced by three differential amplifiers 190, so that each input channel includes three sets of differential inputs. In a similar fashion each output channel as represented by output channel $m_1$ includes three sets of differential outputs 200, 202, 204, the blue, green and red outputs, respectively, in certain applications. The inputs $CM_{0,B}$, $CM_{0,G}$, $CM_{0,R}$ inputs provided to output sections 188-B, 188-G, 188-R and 190-B, 190-G, 190-R are the common mode signals separately processed by single ended common mode core 186 in accordance with this invention, FIG. 8, and delivered on line 98 to be recombined with their associated differential signals in the output stages 184, also shown in FIG. 8. Any desired common mode can be reintroduced at the output of amplifiers 190 through common mode node 191.

Figure 10:
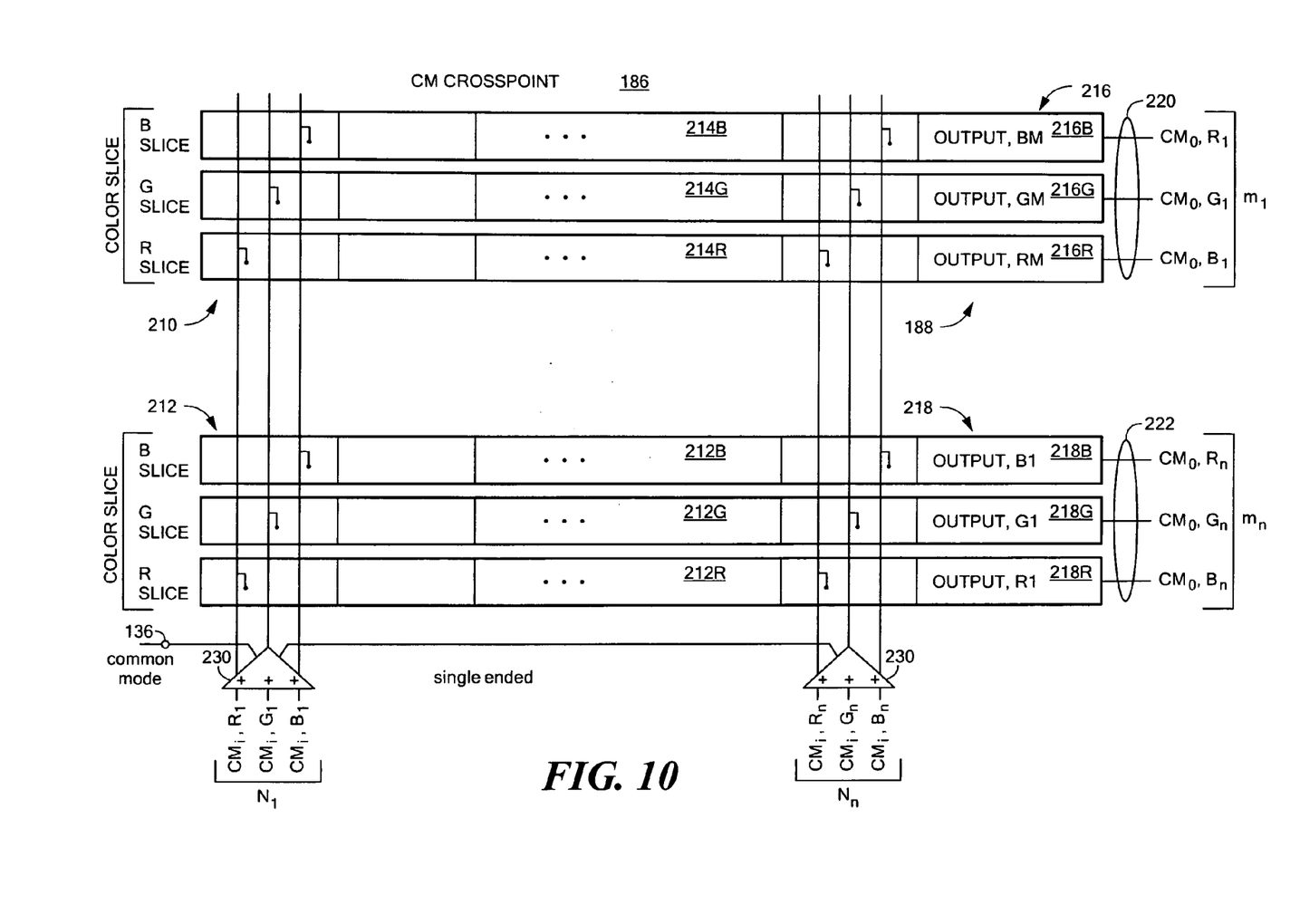
FIG. 10 is a more detailed schematic diagram of the common mode crosspoint of FIG. 8.

Single ended common mode core 186 is shown in more detail in FIG. 10, where each slice 210 . . . 212 is a color slice having three elemental slices, red, blue and green 214-R, 214-G, 214-B, 212-R, 212-R, and 212-B. Here each channel includes three inputs $CMi_{R1}$, $CMi_{G1}$, $CMi_{B1}$-$CMi,R_N$, $CMi,G_N$, $CMi,B_N$. These are the common mode voltages that were removed at taps 196 in FIG. 9. Output stage 188 in FIG. 10 includes output stages 216 . . . 218 where each stage includes a number of stage sections equal to the number of elemental slices. For example, output stage 216 includes output stage sections 216-B, 216-G, 216-R and output stage 218 includes output stage section 218-B, 218-G and 218-R. Here each input channel $N_1 \ldots N_n$ includes three inputs $CMi,R_1$, $CMi,B_1$, $CMi,G_1$ through $CMi,R_n$, $CMi,B_n$ $CMi,G_n$. After switching, these outputs appear on output channels $m_1$-$m_n$ each of which includes three outputs indicated at 220 and 222 as $CM_0,B_1$, $CM_0,G_1$, $CM_0,R_1$ of output channel $m_1$, and $CM_0B_n$, $CM_0,G_n$, $CM_0,R_n$ of output channel $m_n$. It is these outputs that are fed back on line 198 to be recombined with their corresponding differential signals in output stages 184, FIG. 8. A trifferential amplifier as disclosed in FIG. 5, can be used in FIG. 10, as shown at 230 at each input channel to receive the common mode R, G and B signals.

Figure 11:
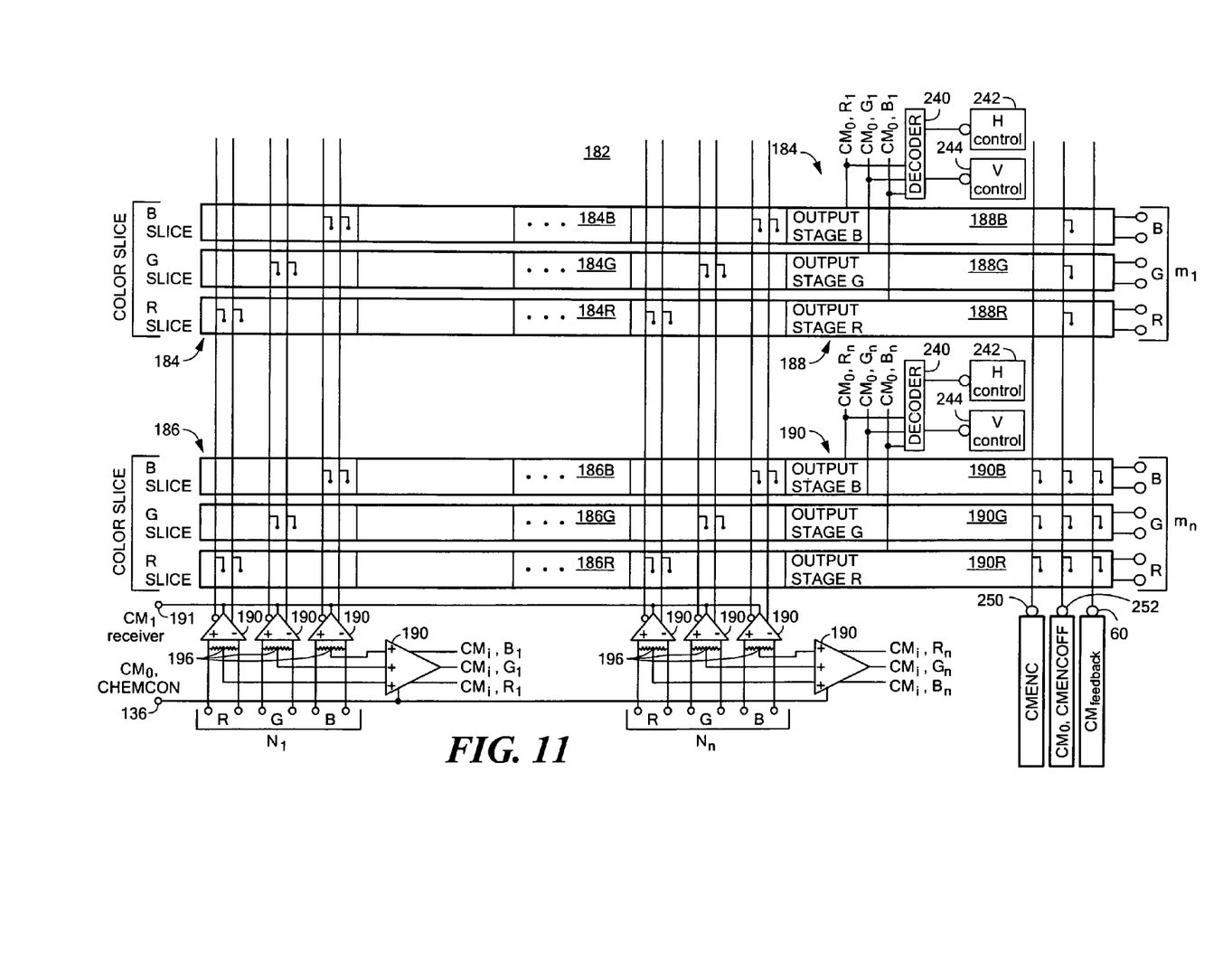
FIG. 11 is a view similar to FIG. 10 showing additional features.
Figure 12:
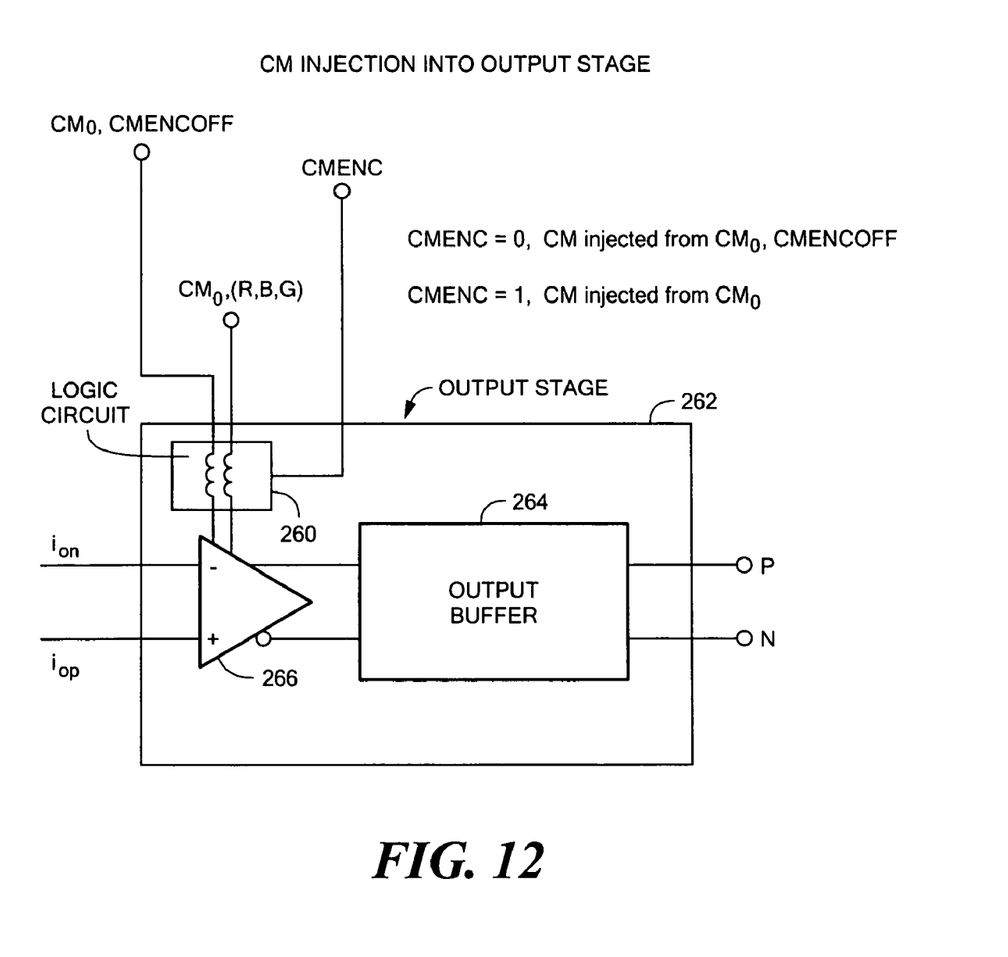
FIG. 12 is a schematic diagram of one embodiment of an output stage section that can be used with this invention.

The removed common mode voltages $CM_0$, $R_1$, $CM_0,G_1$, $CM_0,B_1$ through $CM_0,R_N$, $CM_0,G_N$, $CM_0,B_N$ are presented simultaneously at output stages 188 . . . 190, FIG. 11, with their corresponding signal outputs. While thus far it has been taught that they will be recombined with those corresponding signal outputs to reintroduce the previously removed common mode voltages this is not a necessary limitation of the invention, for as shown in FIG. 11, they may alternatively or conjunctively be delivered to a decoder 240 for selectively driving horizontal control 242 and vertical control 242. In addition to the common mode feedback voltage input 66 there are also two other inputs CMENC at terminal 250 and $CM_0$, CMENCOFF, at terminal 252. When CMENC signal at terminal 250 is zero then the common mode voltage is injected from terminal 252. When the CMENC signal at terminal 250 is at one then the common mode is injected from $CM_0$ which is delivered from single ended common mode core 186. The logic circuit 260, FIG. 12, for accomplishing this is typically included in an output stage such as output stage 262, which also includes output buffer 264 and differential amplifier 266.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A dual core crosspoint system comprising:
    a differential signal core configured to receive N differential input channels and to provide m differential output channels, wherein each of the input and output channels comprises a plurality of differential signals, the differential signal core comprising m rows of cells, each of the m rows comprising:
        N cells configured to receive the N differential input channels; and
        an output stage configured to provide one of the m differential output channels, such that the differential signal core includes m output stages,
        wherein the N cells are configured such that any one of the N differential input channels is provided by the output stage; and
    a common mode core configured to receive N common mode voltage input channels derived from the N differential inputs channels and to provide any one of the N common mode voltage input channels as one of m common mode voltage output channels simultaneously with said m differential output channels.

2. The dual core crosspoint system of claim 1, wherein said m common mode voltage output channels are injected into the m output stages to provide said N differential input channels recombined with their removed common mode voltages.

3. The dual core crosspoint system of claim 1, wherein each of the N differential input channels includes three inputs.

4. The dual core crosspoint system of claim 3, further comprising a trifferential amplifier associated with a respective one of the common mode voltage input channels in the common mode core, wherein the trifferential amplifier is configured to receive three common mode input voltages derived from three corresponding differential input channels.

5. The dual core crosspoint system of claim 1, wherein each of the output stages includes three output sections.

6. The dual core crosspoint system of claim 5, wherein each of the output sections includes a current to voltage converter and a buffer amplifier.

7. The dual core crosspoint system of claim 4, wherein in the trifferential amplifier is further configured to receive a reference common mode voltage.

8. The dual core crosspoint system of claim 1, further comprising a decoder, a vertical control, and a horizontal control, wherein said m common mode voltage output channels are operatively connected to said decoder for selectively driving said vertical and horizontal controls.

9. The dual core crosspoint system of claim 2, wherein each of said differential input channels includes three differential inputs, and each of said common mode voltage output channels includes three single ended inputs.

10. The dual core crosspoint system of claim 1, wherein each of the differential signal core and the common mode core comprises at least one color slice including a plurality of slices.

11. The dual core crosspoint system of claim 1, wherein each of the m output stages includes a logic gate responsive to a control signal for selectively injecting into said output stages either associated common mode voltage output channels or an average common mode voltage.

12. The dual core crosspoint system of claim 10, wherein each of said slices in the differential signal core comprises a feedback circuit connected between the output of its associated output stage and the input of each input channel.

13. The dual core crosspoint system of claim 12, wherein each of the slices in said differential signal core is configured to provide a differential feedback signal.

14. The dual core crosspoint system of claim 13, wherein each of the slices in said differential signal core further comprises an attenuator circuit in said feedback circuit configured to remove a common mode voltage in the differential feedback signal and to redefine the common mode voltage applied to each differential input channel.

15. The dual core crosspoint system of claim 12, wherein each of the slices in said common mode core is configured to provide a single ended feedback signal.

16. The dual core crosspoint system of claim 12, wherein each of the slices in said common mode core further comprises an attenuator circuit.

* * * * *

UNITED STATES PATENT AND TRADEMARK OFFICE
CERTIFICATE OF CORRECTION

| | | |
|---|---|---|
| PATENT NO. | : 8,023,422 B2 | Page 1 of 1 |
| APPLICATION NO. | : 11/716965 | |
| DATED | : September 20, 2011 | |
| INVENTOR(S) | : Stefano D'Aquino et al. | |

It is certified that error appears in the above-identified patent and that said Letters Patent is hereby corrected as shown below:

At column 3, line 33, please change "$m_n$." to --$m_{n-1}$, $m_n$.--.

At column 7, line 22, in Claim 7, after "wherein" delete "in".

Signed and Sealed this
Third Day of April, 2012

David J. Kappos
*Director of the United States Patent and Trademark Office*